(12) United States Patent
Quimby

(10) Patent No.: US 6,519,690 B1
(45) Date of Patent: Feb. 11, 2003

(54) FLEXIBLE ADDRESS PROGRAMMING WITH WRAP BLOCKING

(75) Inventor: Michael S. Quimby, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/379,020

(22) Filed: Aug. 23, 1999

(51) Int. Cl.⁷ .............................................. G06F 12/00
(52) U.S. Cl. ...................... 711/202; 711/209; 711/210; 711/158; 711/163
(58) Field of Search ................................ 711/209, 151, 711/158, 202, 210, 152, 163

(56) References Cited

U.S. PATENT DOCUMENTS

| | | | | |
|---|---|---|---|---|
| 5,751,991 A | * | 5/1998 | Leach et al. | 711/214 |
| 6,012,135 A | * | 1/2000 | Leedom et al. | 711/208 |

OTHER PUBLICATIONS

*ELAN™SC400 and Elan SC410 Single–Chip Low–Power PC/AT–Compatible Microcontrollers*, Data Sheet, Advanced Micro Devices, Inc., Dec. 1998, pp. 1 through 132.

*The Elan™ SC410 Microcontroller*, Product Brief, Advanced Micro Devices, Inc., © 1999, 3 pages, http://www.amd.com/products/lpd/elan410/21328a.html.

*AMD Chipset Product Overview: AMD–640™ Chipset*, Advanced Micro Devices, Inc., © 1999, 5 pages, http://www.amd.com/products/cpg/chipset.21343a.html.

*AM186™ CC High–Performance, 80C186–Compatible 16–Bit Embedded Communications Controller*, Data Sheet, Advanced Micro Devices, Inc., Jun. 1998, pp. 1 through 100.

*80960CA–33,–25,–16–, 32–Bit High–Performance Embedded Processor*, ©Intel Corporation, 1993, table of contents and pp. 1 through 46.

*The Indispensable PC Hardware Book: Your Hardware Questions Answered*, Third Edition, by Hans–Peter Messmer, copyright © Addison Wesley Longman 1997, title page and pp. 614 through 630.

* cited by examiner

Primary Examiner—Matthew Kim
Assistant Examiner—Matthew D. Anderson
(74) Attorney, Agent, or Firm—Akin Gump Strauss Hauer & Feld LLP

(57) ABSTRACT

A flexible address mapping method and mechanism allows mapping regions of a microcontroller's memory and I/O address spaces for a variety of applications by defining memory regions which are mapped to one of a set of physical devices by a programmable address mapper controlled by a set of programmable address registers. The mapping allows setting attributes for a memory region to prohibit writes, caching, and code execution. A deterministic priority scheme allows memory regions to overlap, mapping addresses in overlapping regions to the device specified by the highest priority programmable address register.

21 Claims, 7 Drawing Sheets

FLEXIBLE ADDRESS PROGRAMMING WITH WRAP BLOCKING

BACKGROUND OF THE INVENTION

1. Field of the Invention

The present invention relates generally to a computer system addressing architecture, and more particularly to an addressing architecture which allows mapping a single memory address space onto multiple physical devices limiting the mapping to the addressability of the physical device.

2. Description of the Related Art

Many computer systems provide the ability to address physical devices by assigning address ranges to each device. Operating systems and application software access system memory and other addressable devices by writing to or reading from an address in memory space. Other devices are accessed through reading and writing special addresses or "ports" defined in an I/O address space. An example of the former is the boot ROM; an example of the latter are modems.

In the conventional computer system, each device is typically defined at a fixed range of addresses in either memory or I/O address space, assigned by either an industry standard or a specific manufacturer. Typically, the system ROM is addressed in the 640K region immediately below 1M. Below that, systems reserve space for BIOS extensions and video RAM. Old memory management systems such as Expanded Memory Specification (EMS) used holes left in this 640K to 1M space for mapping accesses to regions above the 1M line.

Conventional memory controllers define a "hole" into which ROMs can be mapped. Other conventional controllers allow defining attributes for certain fixed regions of memory.

Early memory controllers provided mechanisms for defining a hole in a block of RAM into which the system ROM could be addressed. More modern conventional controllers shadow (or copy) ROM code and data into that 640K to 1M space in RAM for performance reasons. However, modem controllers still provide the capability to define a hole in RAM for similar purposes. For example, one modem chip set allows defining a hole at either 512K–640K or 15M–16M. A problem with these conventional systems is that the ability to define these holes is limited to fixed specific address ranges.

A second limitation in conventional systems is the ability to define attributes to control access to certain regions of memory space. Some conventional memory controllers allow defining attributes such as write-only, read-only, and non-cacheable to a set of fixed address regions of RAM. Conventional systems typically do not flexibly define attributes to arbitrary memory regions or to ROM. Conventional systems also typically do not define areas to prevent code execution.

In a conventional system, an address which exceeds the upper limit of the addressability of a target device is typically wrapped so that addresses at the beginning of the address space are used instead. This wrapping is not always desirable.

SUMMARY OF THE INVENTION

In a system according to the preferred embodiment, a microcontroller contains an address decoder mechanism for mapping addresses in a memory address space and an I/O address space to memory and non-memory resources. The address decoder provides a number of programmable address registers for controlling a programmable address mapper. The programmable address registers and programmable address mapper provide for a flexible mechanism for assigning devices to a particular address in an address space, allowing defining attributes for controlling access to a region of address space, without requiring complicated programming. If the programmable address register specifies a region that extends beyond the maximum addressable location of the resource, the region is truncated rather than wrapping to the beginning of the resource's addressable locations.

The mechanism can provide improved flexibility in mapping devices into memory and I/O space, such as providing flexibility to overlay devices onto memory ranges and mask out the corresponding region of RAM, which would be useful to help configure multiple devices.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following related to patent applications are hereby incorporated by reference as if set forth in their entirety:

U.S. patent application Ser. No. 09/379,456, entitled FLEXIBLE PC/AT-COMPATIBLE MICROCONTROLLER, filed concurrently, now U.S. Pat. No. 6,401,156;

U.S. patent application Ser. No. 09/379,457, entitled FLEXIBLE MICROCONTROLLER ARCHITECTURE, filed concurrently, now U.S. Pat. No. 6,415,348;

U.S. patent application Ser. No. 09/379,012, entitled GENERAL PURPOSE BUS WITH PROGRAMMABLE TIMING, filed concurrently; and U.S. patent application Ser. No. 09/379,015, entitled METHOD AND APPARATUS FOR OVERLAPPING PROGRAMMABLE ADDRESS REGIONS, filed concurrently.

Figure 1:
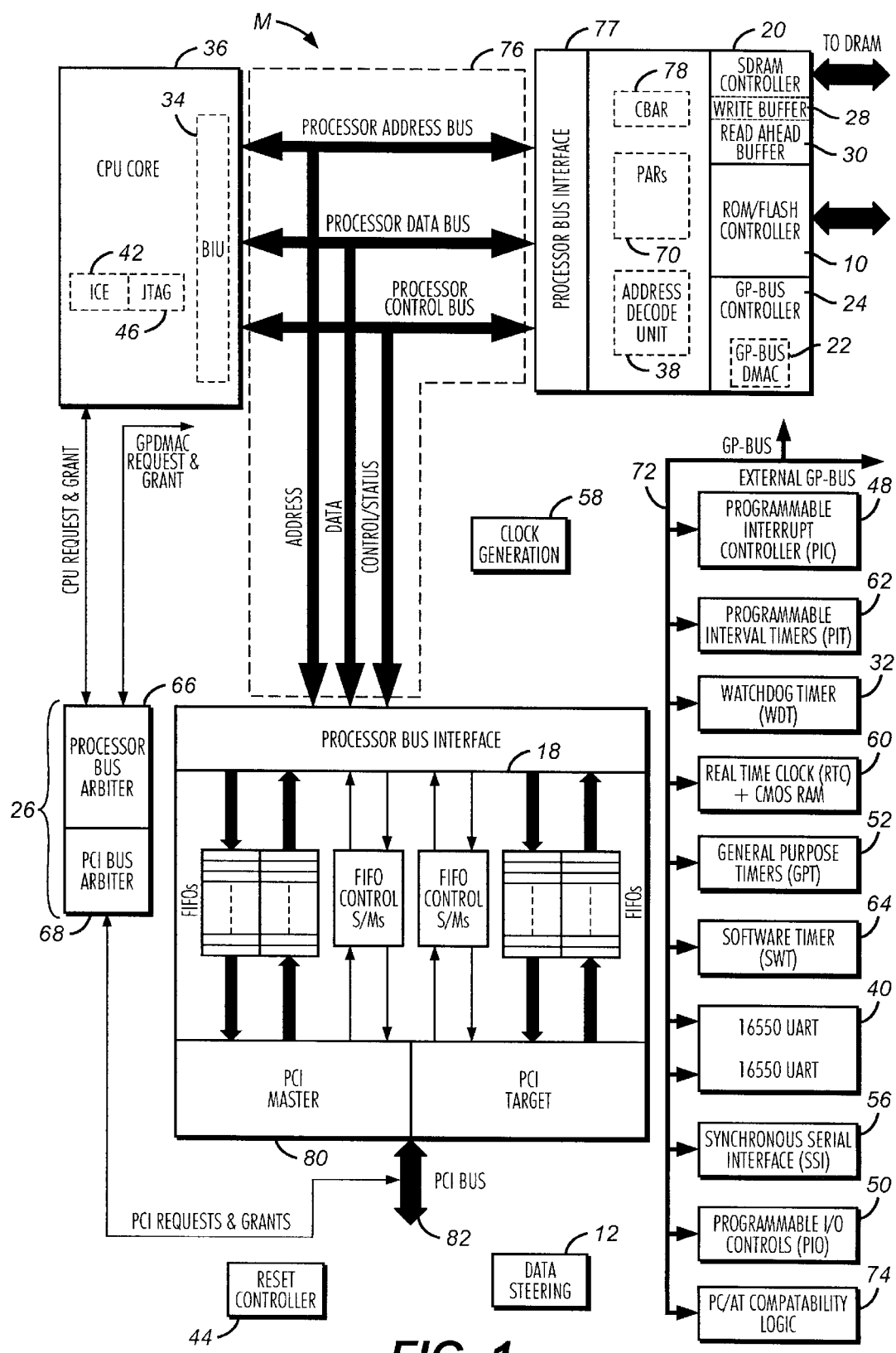
FIG. 1 is a block diagram of a microcontroller containing an embodiment of the present invention.

Turning now to the drawings, FIG. 1 shows a typical microcontroller M in accordance with the present invention. The microcontroller M provides a highly integrated CPU 36 with a complete set of peripherals that are a superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides an address decoding unit (ADU) 90. The ADU 90 provides Programmable Address Region (PAR) registers 70 that enable flexible placement of memory and peripherals into a memory address space and an I/O address space. The PAR registers 70 also allow control of important attributes like cacheability, write protection, and code execution control for memory resources. Both the PAR registers 70 and a Configuration Base Address Register (CBAR) 78 serve as address decode registers. While the PAR registers 70 are memory-mapped, the CBAR 78 is direct-mapped to I/O.

An address decoding logic unit (ADLU) 38 provides flexible distributed memory and I/O address decode logic. Address decode is distributed between a general purpose (GP)-Bus Controller 24, memory controllers such as a read-only memory (ROM) controller 10 and a dynamic random access memory (DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36, the PCI master controller 80, and external PCI bus masters. The memory space and I/O space of the PCI bus 82 are accessible by the CPU 36 and PCI masters 80.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, the general purpose bus DMA controller 22, and the PCI host bridge 18 on behalf of an external bus master requesting access to DRAM. The PCI bus arbiter 68 may arbitrate between five possible PCI masters.

A processor bus interface 77 integrated with the CPU 36 is responsible for DMA cache snooping, dynamic clock speed adjusting, dynamic bus sizing, ready signal consolidation, Memory Mapped Configuration Region (MMCR) control, and general purpose address control. A bus interface unit (BIU) 34 basically assists the CPU 36 with bus, DMA, and memory control.

A clocks module 58 provides oscillators and phase locked loops (PLLs) to support the DRAM controller 20, UARTs 40, general purpose timers (GPT) 52, and a real-time clock (RTC) 60.

The DRAM controller 20 provides SDRAM (synchronous DRAM) support, symmetric and asymmetrical DRAM support, SDRAM auto refresh support, SDRAM Error Correction Code (ECC) support, DRAM write buffering support, DRAM read pre-fetching support, read-around-write support, and supports up to 256 megabytes of DRAM. The DRAM controller 20 may service requests from the CPU 36, the PCI host bridge 18 on behalf of an external PCI master, or the general purpose bus DMA controller and may issue commands to SDRAM devices. DRAM cycles may be also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and DRAM. Features of the controller 22 includes support for up to 7 DMA request channels (with a maximum of 4 external requests), support for three 16-bit channels and four 8-bit channels, buffer chaining capability in enhanced mode, fly-by (single cycle) transfers between general purpose bus peripherals and DRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

A debug core 42 provides an integrated debug interface for embedded hardware/software debug during a special debug mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller DRAM space. The PCI Host bridge 18 may be a 33 MHz, 32-bit PCI Bus Revision 2.2-compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 10 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second timeout with a 33 MHz CPU clock.

The PC/AT compatibility logic 74 provides PC/AT-compatible functions. The PC/AT compatible integrated peripherals include the DMA controller 22, the PIT 62, the PIC 48, the GPT 52, the UARTs 40, and the RTC 60.

This particular microcontroller is illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
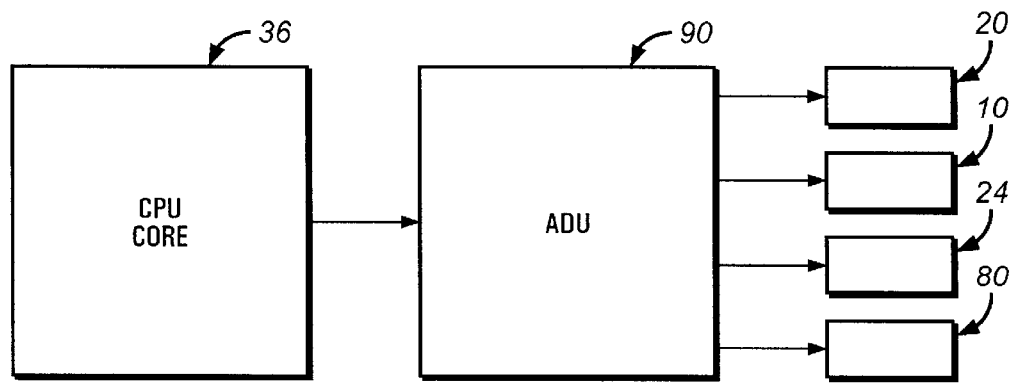
FIG. 2 is a block diagram of some particular features of the microcontroller of FIG. 1 according to one embodiment.

Turning to FIG. 2, a block diagram of some particular features of the microcontroller of FIG. 1 according to one embodiment is shown. Addresses are passed from the CPU core 36 to the address decoder unit (ADU) 90. The ADU 90 uses the facilities of the programmable address registers 70 to route the address to the appropriate device controller. In one aspect of the embodiment of the present invention, the ADU 90 routes the address to the DRAM controller 20, the ROM controller 10, the GP-bus controller 24, or the PCI bus controller 80.

Figure 3:
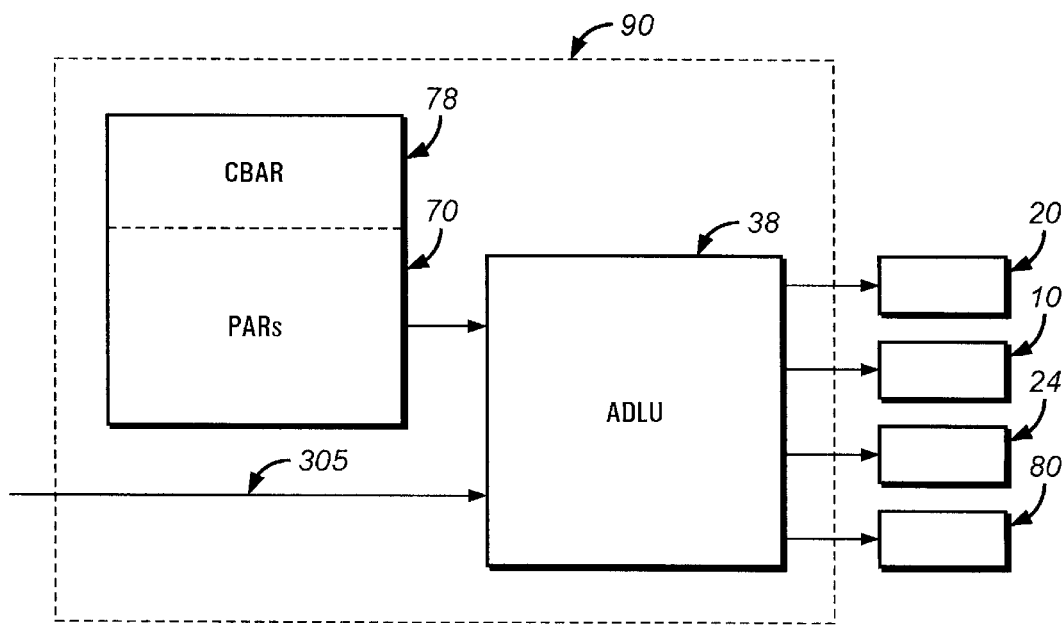
FIG. 3 is a block diagram of an address decode unit for the microcontroller of FIG. 1 according to one embodiment.

In FIG. 3 a block diagram of an implementation of the ADU 90 according to one aspect of an embodiment of the present invention is shown. The ADLU 38 is an example of a programmable address mapper controlled by a set of programmable address registers 70. In addition, the CBAR 78 allows aliasing the PARs 70 to a location accessible in real mode, for ease of programming. Under the control of the PARs 70, the ADLU 38 routes the address signal 305 to the target device controller 10, 20, 24, and 80.

Programmable Address Registers (PARs)

Figure 4:
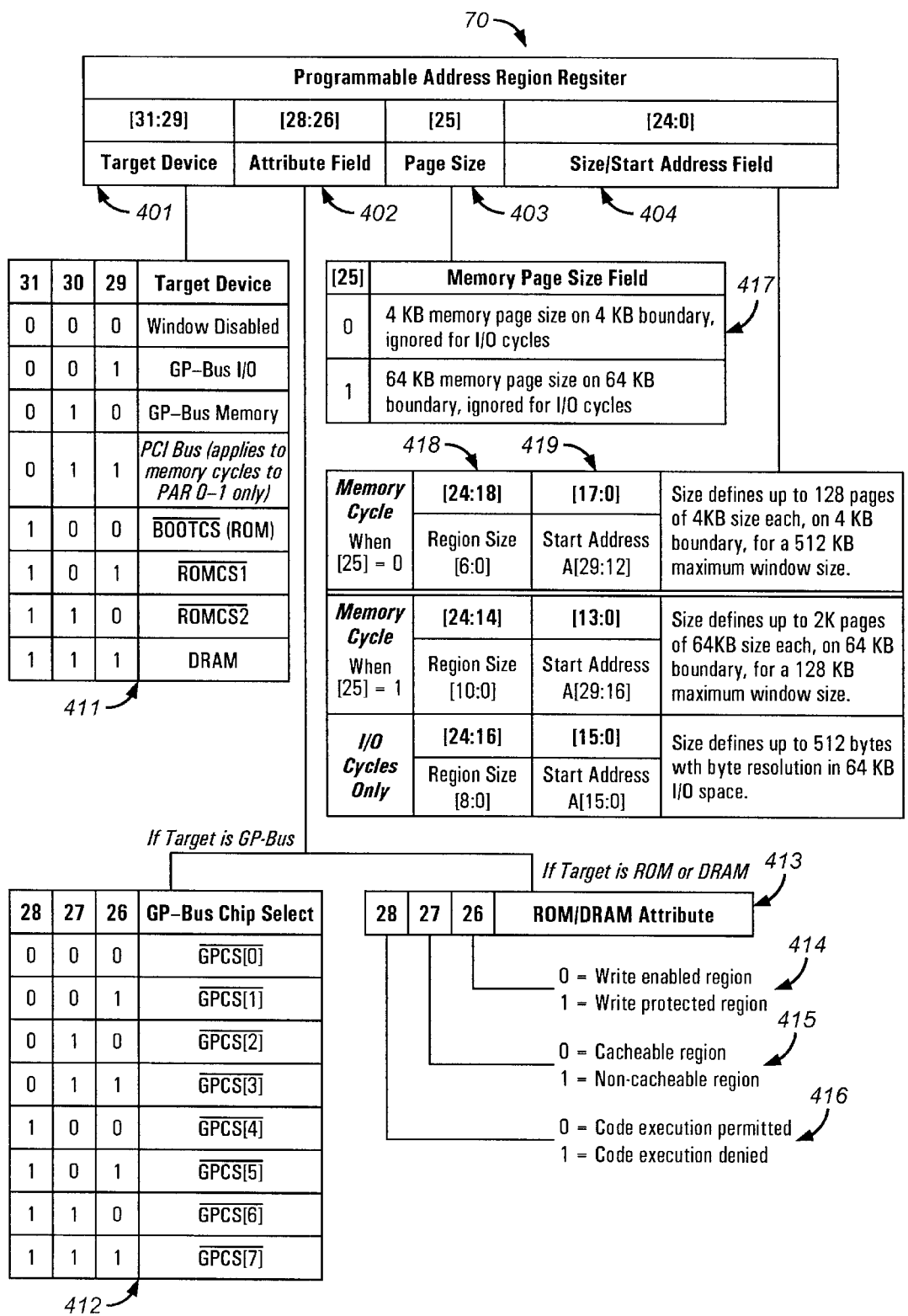
FIG. 4 is a block diagram of a set of programmable address registers according to one aspect of an embodiment of the present invention.

In FIG. 4, a Programmable Address Register (PAR) 70 according to one aspect of an embodiment of the present invention is shown. A PAR provides a place to specify and define an address region and its attributes for use by the address decoder. The PARs 70 control the address decoder logic unit 38, directing the mapping of addresses from a unified memory or I/O address space into one of the several device controllers. This allows a flexible assignment of devices at any necessary or desirable address within the unified memory or I/O address space.

The PAR comprises four fields: a target device field 401; and attribute field 402; a page size field 403; and a size/start address field 404. As shown in Table 411, the target device field 401 allows defining the address region as disabled or directed to the general purpose (GP) bus 72, the PCI bus 82, the ROM controller 10, or the DRAM controller 40. Accesses to the GP bus 72 are done through the GP-bus controller 24 and can be mapped either into I/O space or memory space. Access to ROM devices can be separately defined to the boot ROM or one of two other ROM devices. One skilled in the art will recognize that these fields are illustrative and exemplary and other fields and/or implementations could be used without departing from the spirit of the invention.

The meaning of the attribute field of a PAR 70 depends on the value of the target device field 401. If the target is the GP bus 72, then according to the preferred embodiment the attribute field defines a chip select to which the device is attached as shown in a Chip Select Table 412. If the target device field 401 indicates a ROM or RAM device, then the meaning of the attribute field is shown in an attribute Table 413. PCI target devices ignore the attribute field 402.

Three attributes can be defined for ROM/RAM devices according to the preferred embodiment: write-enable/protect 414, cacheable/non-cacheable 415, or code execution-permitted/denied 416, as shown in an attribute Table 413. If the write-protect attribute 414 indicates the region is write-protected, an attempt to write to an address in the region will cause an interrupt to be generated, the write operation will be inhibited, and the contents of the ROM/RAM device will not be modified. Execution control 416 works in a similar manner to the write-enable/protect attribute. If an attempt is made to fetch an instruction to the CPU from the defined region a code fault will be generated by returning an invalid op-code to the CPU instead of the data resident in the device at the requested address. One skilled in the art will recognize that this implementation is illustrative and exemplary, and that other attributes or implementations could be used without departing from the spirit of the invention.

The page size field 403 defines the size of the pages in the address region defined in the size/start address field 404. In the preferred embodiment, either 4K or 64K pages are defined. As noted in the page size Table 417, this field is ignored if the target device is a GP-bus device in I/O space. The value of the page size field 403 also indicates that the start address 419 is on a 4K or 64K boundary.

The size/start address field 404 defines the size and location of the address region defined by the PAR 70. If the target device 401 defines a GP-bus attached device in I/O space then the region size field 418 defines up to 512 bytes starting at the start address byte address indicated in start address field 419. If target device 401 defines a device in memory space, and the page size field 403 indicates 4K pages, then the size field 418 specifies up to 128 pages of 4K each, on a 4 KB boundary defined in the start address field 419, for a 512 KB maximum region size. If the page size field 403 indicates 64K pages, then the size field 418 specifies up to 2K pages of 64K each, on a 64K boundary defined in the start address field 419, for a 128 MB maximum region size.

Wrap Blocking

If the size/start address field 404 defines an address region which would extend beyond the limits of the target device 401, the actual address region defined by the PAR register 70 is limited by the target device 401. It is possible to program the PAR register 70 such that the region size field 418 is greater than the start address field 419 allows when mapped to the target device 401. In that case, the address region defined by the PAR register 70 is limited to the maximum address allowed by the target device 401 instead of wrapping to the beginning of the addressable locations assigned to the resource. For example, if the region size field 418 specifies a 64 KB region, but the start address field 419 is programmed to be the top of the 1 GB region (the maximum address controllable by a PAR register 70) minus 4 KB, then the address region defined by the PAR register 70 will be the 4 KB region at the original start address. In one embodiment an address above the 1 GB boundary will be mapped to the PCI bus. In another example, if a PAR register 70 specifies a target device 401 that is RAM, and the region sized field 418 specifies an 8 KB region, but the start address field 419 specifies an address at the top of the RAM minus 4 KB then addresses above the top of RAM will not be controlled by this PAR register 70.

One skilled in the art will recognize that the implementation described above is illustrative and exemplary and other fields, values, and implementations could be used without departing from the spirit of the invention.

GP-Bus Example

In this example, an A/D converter has four 16-bit registers that need to be mapped into I/O space on Chip Select 5 at I/O address 0x0500. The value to program into a PAR register is 0x34070500.

| Target Device | 001b | GP-bus I/O space |
|---|---|---|
| Attribute Field | 101b | GP-bus Chip Select 5 |
| Page Size | 0b | N/A |
| Region Size | 007h | Specifies an 8 byte region size |
| Start Address | 0500h | Physical Address 0 × 0500 |

Programming a PAR register with the GP-bus as the target as above will cause I/O to be forwarded to the external GP-bus. After a PAR 70 is programmed as in this example, an IN or OUT instruction in the CPU specifying an address between 0x0500 and 0x0507 will be directed to the GP external bus to the registers in the A/D converter. This provides a means for the CPU to directly address the registers in the A/D converter. If the A/D converter does its own address decoding, the chip select from the PAR register does not need to be mapped to a physical pin. For a device that requires a chip select, instead of doing its own address decoding, the chip select must be mapped to a physical pin by the microcontroller according to one aspect of an embodiment of the present invention. Mapping a chip select to a physical pin is described in detail in the commonly assigned patent applications entitled "GENERAL PURPOSE BUS WITH PROGRAMMABLE TIMING" and "FLEXIBLE PC/AT-COMPATIBLE MICROCONTROLLER," previously incorporated herein by reference.

PCI Bus Example

According to one aspect of the preferred embodiment, devices on the PCI bus are mapped into memory space above the configured amount of RAM and below the 4GB line. Accesses to those locations do not go through the PARs 70, but are automatically mapped to the PCI bus. However, for WINDOWS® compatibility, some PCI devices such as PCI-based VGA video cards and PCI network adapters need to be mapped into RAM space, usually below the real mode address limit (0x0010FFEF). According to one embodiment, not all of the PARs 70 can be used to map PCI devices into memory space; only PAR register 0 or PAR register 1 can be used for that purpose.

Figure 8:
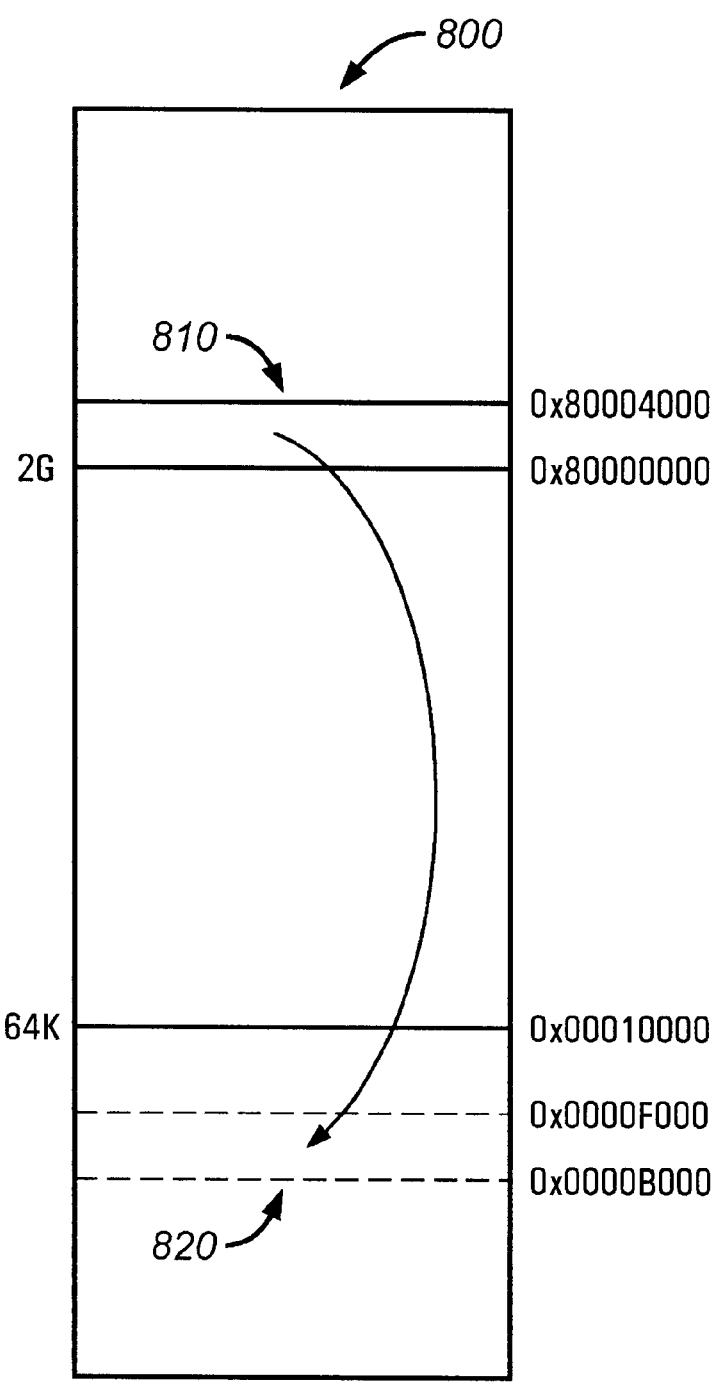
FIG. 8 is a block diagram of memory showing aliasing a device address.

A memory-mapped network adapter will usually reside in PCI space which is far above the real mode address limit. However, to perform Remote Program Loading (RPL) over a network the 16-bit BIOS needs to use the network adapter. To avoid writing 32-bit protected mode BIOS code, PAR register 0 or PAR register 1 can be used to alias a memory mapped network adapter below the real mode address limit. For this example, it is assumed that the network adapter has 16K of address space which needs to be placed at 0x000B0000. This area is non-cacheable because it is PCI address space. FIG. 8 is a diagram of memory address space 800 showing aliasing this memory adapter by use of a PAR register 70. Area 810 represents the 16 KB region in PCI space at the 2 GB address, which is above the 64 KB maximum address of a real mode program. By use of a PAR register 70, the 16 KB region 810 can be mapped to the 16KB region 820, which is below the 64 KB line.

The value to configure PAR register 0 or PAR register 1 for this is 0x600C00B0. This configures PAR register 0 or PAR register 1 with the following characteristics:

| Target Device | 011b | PCI bus |
|---|---|---|
| Attribute Field | 000b | N/A |
| Page Size | 0b | 4 KB pages |
| Region Size | 03h | Specifies four 4 KB pages for a 16 KB region size |
| Start Address | 000B0h | Physical Address 0 × 000B0000 |

ROM Example

PARs 70 can be configured to define addresses for any of three ROM devices. In one aspect of the preferred embodiment, the top 64 KB of the boot ROM is always mapped to a fixed address from 0xFFFF0000 to 0xFFFFFFFF. This mapping is fixed and active even if the PARs 70 map the ROM to another address to alias the ROM.

A 512 KB FLASH device is a common boot device for systems with a BIOS. One way to shadow the BIOS, is to map it below 0x00100000 so that it can be accessed by real mode code. This is easily done with a single PAR register 70. The value 0x89FC0001 configures the PAR register 70 with the following characteristics:

| Target Device | 100b | BOOTCS |
|---|---|---|
| Attribute Field | 010b | Write-enable, non-cacheable, code execute permitted |
| Page Size | 0b | 4 KB pages |

-continued

| | | |
|---|---|---|
| Region Size | 7Fh | 128 4 KB pages for a 512 KB region size |
| Start Address | 00001h | Physical Address 0 × 00001000 |

RAM Example

The PAR registers 70 can be used to define regions of RAM to control the write enable, cacheability, and execution attributes.

A PAR register 70 can be used to write protect code in a system. If errant code attempted to write to the protected region, the an interrupt would be generated. Assuming the code resides in the first 768 KB of RAM at address 0, the value 0xE602C000 configures a PAR register with the following values:

| | | |
|---|---|---|
| Target Device | 111b | RAM |
| Attribute Field | 001b | Write-disable, cacheable, code execution permitted |
| Page Size | 1b | 64 KB pages |
| Region Size | 00Bh | Specifies 12 64 KB pages for a 768 KB region size |
| Start Address | 0000h | Physical Address 0 × 00000000 |

Figure 5:
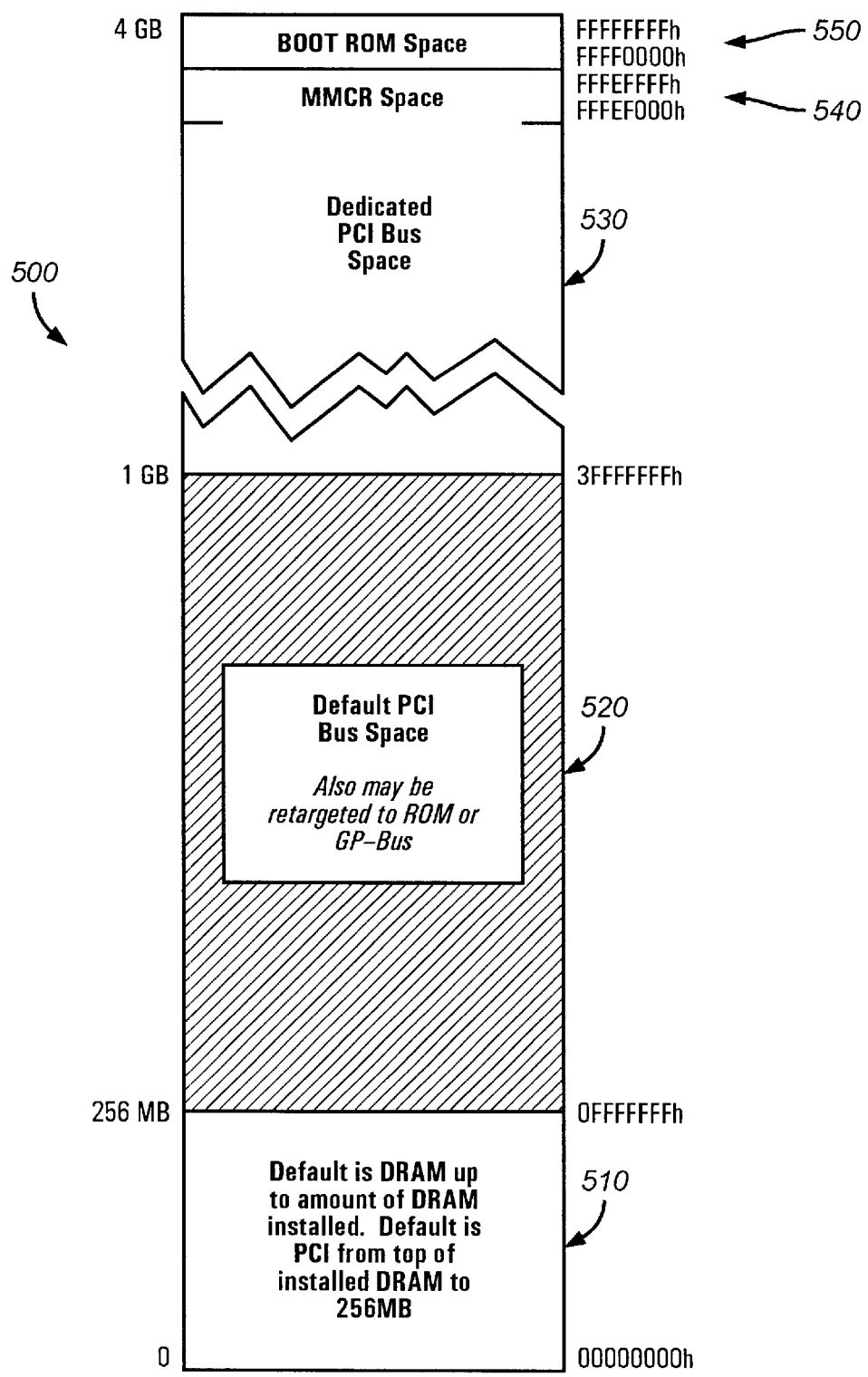
FIG. 5 is a diagram of memory address space.

Turning to FIG. 5, memory space 500 is divided into five areas. Area 510 is the area corresponding to the amount of RAM installed. In one aspect of the preferred embodiment, a maximum of 256 MB of RAM may be installed. Access to and attributes of area 510 may be reconfigured using PAR registers 70. Area 520 defaults to PCI bus memory space, but may be directed using PAR registers 70 to any appropriate non-RAM target device. Area 530 is dedicated to the PCI bus memory space and cannot be redirected using a PAR register 70. Area 540 is dedicated to a memory mapping configuration region, and contains the PAR registers 70. Area 550 is dedicated to 64 KB of boot ROM, which can be aliased using the PAR register 70.

Prioritization

Figure 6:
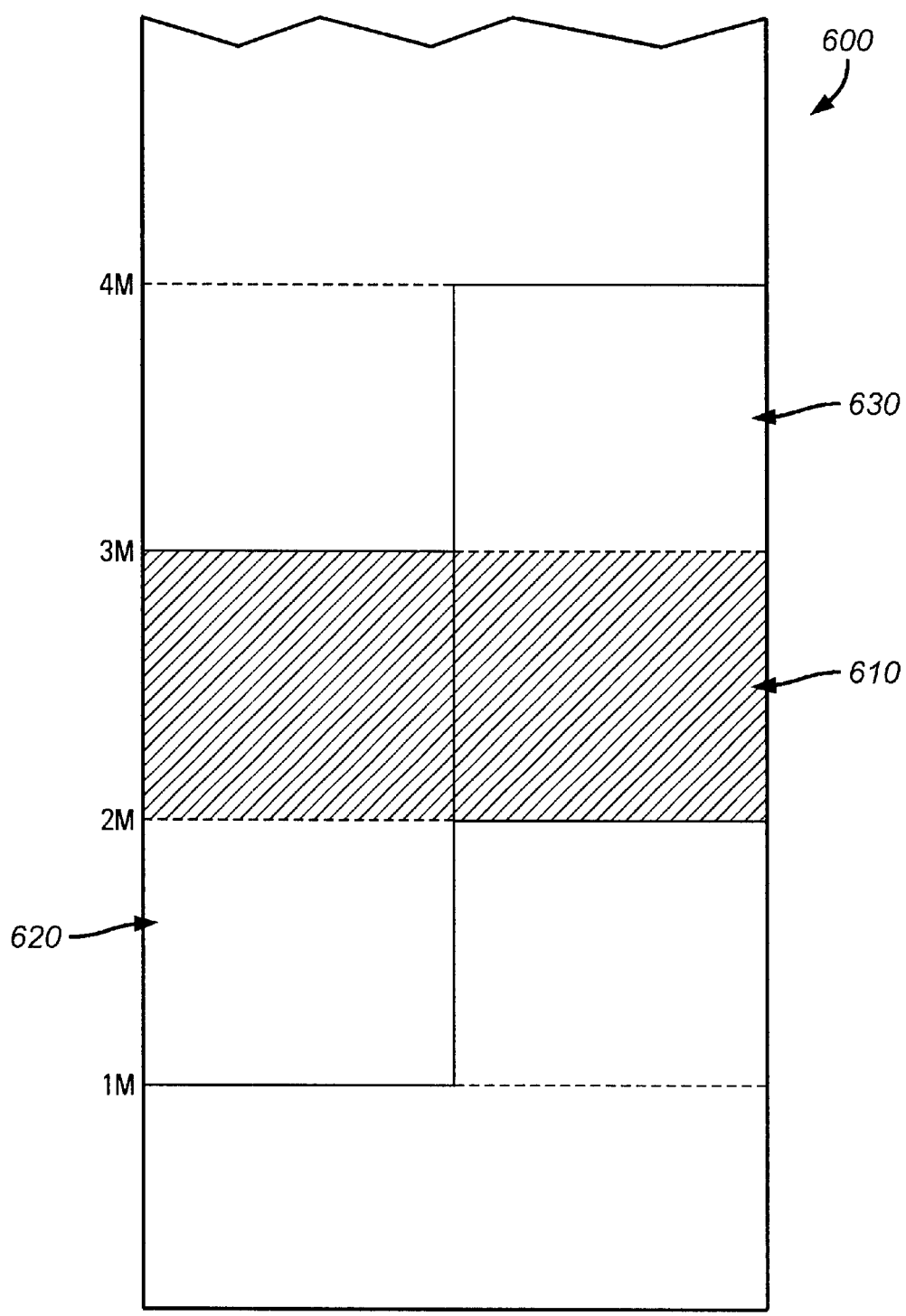
FIG. 6 is a block diagram showing overlapping regions of memory address space configured according to an embodiment of the present invention.

One aspect of an embodiment of the present invention provides a deterministic method of prioritizing access when the PAR registers 70 configure overlapping memory regions. In conventional systems, the result of an access to an overlapped region is non-deterministic and usually causes an error. According to one aspect of the preferred embodiment, each PAR register 70 is assigned a priority number. PAR register 0 is given priority 0, PAR register 1 is given priority number 1, etc. If overlapping regions are defined, the definition in the lowest numbered PAR register 70 controls the access. Turning to FIG. 6, memory space 600 has been configured by two PAR registers 70 as follows: line 10.

| | | |
|---|---|---|
| Target Device | 111b | DRAM |
| Attribute Field | 100b | Write-protected, cacheable, execution allowed |
| Page Size | 1b | 64 KB pages |
| Region Size | 01Fh | 32 pages of 64 KB for a 2 MB region size |
| Start Address | 0010h | 1 M |

PAR register 2 defines area 630 as follows:

| | | |
|---|---|---|
| Target Device | 111b | DRAM |
| Attribute Field | 001b | Write-enabled, cacheable, execution prohibited |
| Page Size | 1b | 64 KB pages |

-continued

| | | |
|---|---|---|
| Region Size | 01Fh | 32 pages of 64 KB for a 2 MB region size |
| Start Address | 0020h | 2 M |

As shown in FIG. 6, these PAR registers 70 define a 1 MB overlapping region from 2M to 3M. Because PAR register 1 has a lower number, accesses to memory in the area 610 are controlled by PAR register 1, prohibiting writes, but allowing execution of code.

The foregoing description and disclosure of the PAR registers and prioritization mechanism are illustrative and exemplary thereof, and one skilled in the art will recognize that various changes in the arrangement, implementation, and use may be made without departing from the spirit of the invention.

Figure 7:
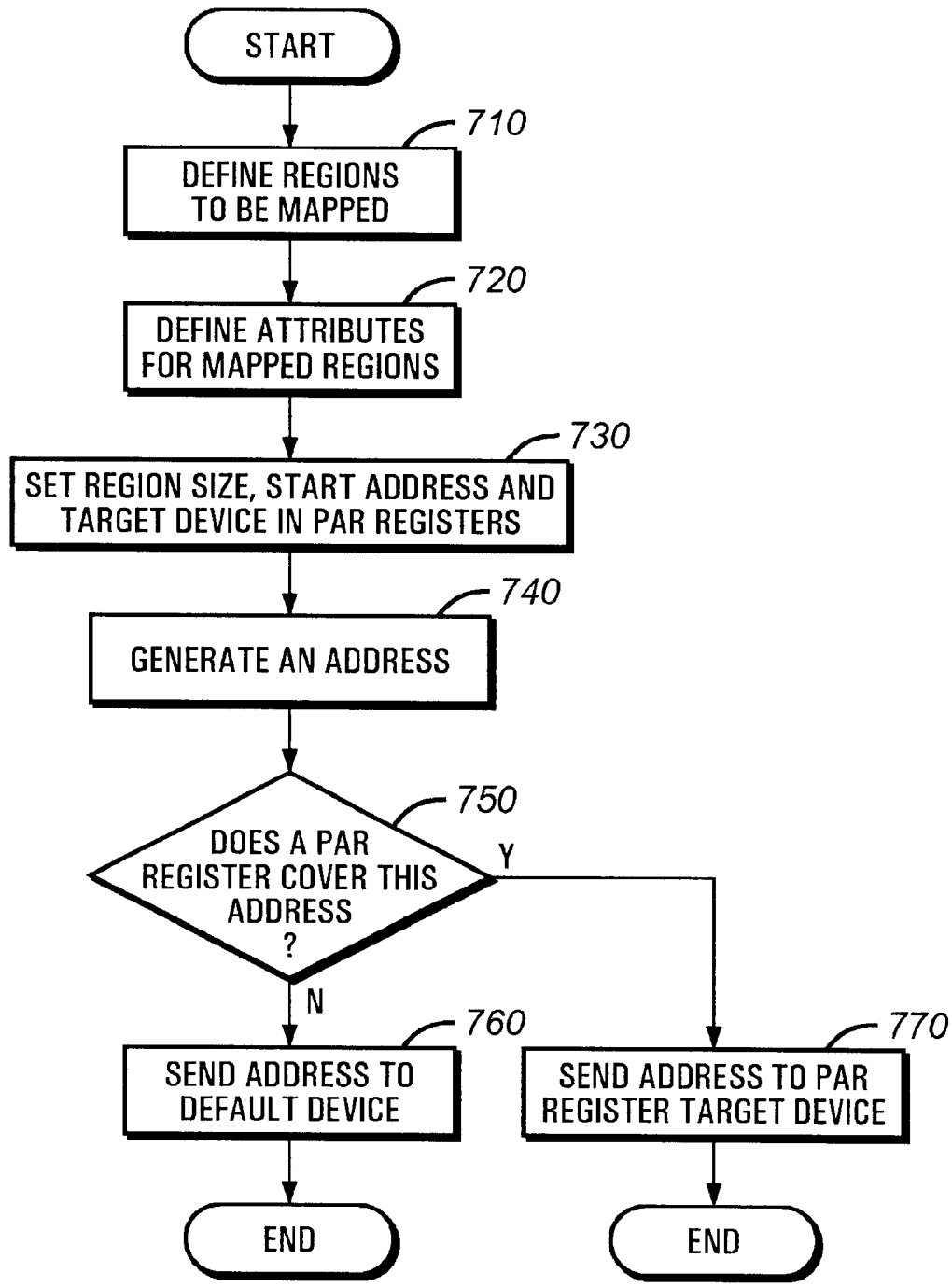
FIG. 7 is a flow chart describing a method of configuring a set of programmable address registers.

Turning to FIG. 7, a flow chart of the method for configuring memory or I/O space is shown. In step 510, the programmer defines a collection of memory regions to be defined on top of memory or I/O space. In step 520, attributes are established for each PAR-mapped region as shown in FIG. 2. Then the address region size, start address, and target device values are set in step 530 as shown in FIG. 2, in a PAR register 70 for each address region. Once an operation, an address is generated in step 540. In step 550, the determination is made if a PAR register 70 covers the generated address. If yes, the address is routed to the indicated target device in step 560; if no, the address is sent to the default choice for that area of memory space.

One skilled in the art will recognize that the foregoing method is illustrative and exemplary, and various changes in the method of operation may be made without departing from the spirit of the invention.

The foregoing disclosure and description of the invention are illustrative and exemplary thereof, and various changes in the illustrated apparatus and construction and method of operation may be made without departing from the spirit of the invention.

What is claimed is:

1. An address decoder mechanism for mapping addresses in a system providing a memory address space and an I/O address space and both memory and non-memory addressable resources having resource controllers each having a maximum addressable location, the mechanism comprising:

a programmable address mapper for passing an address to one of the resource controllers; and a programmable address register coupled to the programmable address mapper for controlling the programmable address mapper, such that when the address is within a range specified by the programmable address register, the programmable address mapper passes the address to the resource controller specified by the programmable address register, wherein the programmable address register is selectively programmable to force the programmable address mapper to map to both memory and non-memory resource controllers, and wherein the range specified by the programmable address register is truncated at the maximum addressable location of the resource controller specified by the programmable address register.

2. An address decoder mechanism as in claim 1, where each of the programmable address registers comprise:

a plurality of target resource selector bits; and a plurality of address region definition bits.

3. An address decoder as in claim 2, where the address region definition bits comprise:
   a plurality of address region page size bits;
   a plurality of address region size bits; and
   a plurality of address region beginning location bits,
   wherein the address region size bits specify a size in pages.

4. An address decoder as in claim 1, wherein the programmable address registers are addressable in the memory address space.

5. An address decoder as in claim 4, further comprising:
   an aliasing mechanism to alias the register to a different address in the memory address space for ease of programming.

6. An address decoder as in claim 1, further comprising a plurality of the programmable address registers.

7. An address decoder as in claim 6, wherein some of the programmable address registers can only specify less than all of the resource controllers.

8. An address decoder as in claim 1, wherein the programmable address mapper does not pass an address to any resource controller if the address is not within a range specified by one of the programmable address registers.

9. An address decoder mechanism for mapping addresses in a system providing a memory address space and an I/O address space and a plurality of memory and non-memory addressable resources having resource controllers each having a maximum addressable location, the mechanism comprising:
   a programmable address mapper for passing an address to one of the resource controllers;
   a plurality of programmable address registers for controlling the programmable address mapper, such that when the address is within a range specified by any of the programmable address registers, the programmable address mapper passes the address to the resource controller specified by the programmable address register; and
   a priority mechanism for deciding which of multiple programmable address registers will control the actions of the programmable address mapper when a pair of the programmable address registers specify overlapping ranges,
   wherein the range specified by the programmable address register is truncated at the maximum addressable location of the resource controller specified by the programmable address register.

10. An address decoder as in claim 9, wherein the priority mechanism comprises each programmable address register having a predetermined assigned priority, and
    wherein priority is given to the programmable address register with the highest assigned priority.

11. An address decoder mechanism for mapping addresses in a system providing a memory address space and an I/O address space and a plurality of memory and non-memory addressable resources having resource controllers each having a maximum addressable location, the mechanism comprising:
    a programmable address mapper for passing an address to one of the resource controllers; and
    a plurality of programmable address registers for controlling the programmable address mapper, such that when the address is within a range specified by any of the programmable address registers, the programmable address mapper passes the address to the resource controller specified by the programmable address register,
    wherein each of the programmable address registers defines a plurality of attributes to limit access to the specified address range,
    wherein the programmable address mapper generates an exception instead of passing an address to the specified resource controller if an attempt is made to access the address in violation of the attributes, and
    wherein the range specified by the programmable address register is truncated at the maximum addressable location of the resource controller specified by the programmable address register.

12. An address decoder as in claim 11, wherein the attributes are selected from the set comprising read-only, non-cacheable, and code execution prohibited.

13. A microcontroller adapted for mapping addresses from a memory address space and an I/O address space to a set of memory and non-memory resources, comprising:
    a CPU, wherein the CPU generates an address;
    a plurality of memory and non-memory resource controllers each having a maximum addressable location;
    an address decoder unit for decoding addresses and passing addresses to the resource controllers, comprising:
      a programmable address mapper for passing an address to one of the resource controllers; and
      a plurality of programmable address registers for controlling the programmable address mapper, such that when the address is within a range specified by any of the programmable address registers, the programmable address mapper passes the address to the resource controller specified by the programmable address register,
    wherein the range specified by the programmable address register is truncated at the maximum addressable location of the resource controller specified by the programmable address register.

14. A microcontroller as in claim 13, where the address decoder unit further comprises:
    a priority mechanism for allowing the programmable address mapper to choose which programmable address register to use when the regions specified by a pair of programmable address registers overlap.

15. A microcontroller as in claim 13, wherein each of the programmable address registers specifies attributes to control access to addresses within the address range specified by the programmable address register; and
    wherein the programmable address mapper generates an exception when an attempt is made to access and address in violation of the attributes.

16. A method for adapting a microcontroller having a memory address space and an I/O address space, a plurality of addressable memory and non-memory resource controllers each having a maximum addressable location, a programmable address mapper for passing an address to one of the resource controllers, and a plurality of address registers for controlling the programmable address mapper, to programmably map addresses to memory and non-memory devices, the method comprising the steps of:
    programming each of the programmable address registers by specifying an address region and a target resource controller;
    determining which programmable address register specifies an address region including an address to be mapped; and
    mapping the address to the target resource controller specified in the selected programmable address register, wherein the range specified by the programmable address register is truncated at the maximum addressable location of the resource controller specified by the programmable address register, wherein the range specified by the programmable address register is truncated at the maximum addressable location of the resource controller specified by the programmable address register.

17. A method as in claim 16, further comprising the steps of:

defining attributes for the memory region specified by each of the programmable address regions; and generating an exception if access to the address is in violation of the attributes.

18. A method as in claim 16, further comprising the steps of:

defining a priority for each of the programmable address registers; and selecting the programmable address register with the highest priority when a pair of programmable address registers have been programmed with ranges that include the address.

19. An address decoder mechanism for mapping addresses in a system providing a memory address space and an I/O address space and both memory and non-memory addressable resources having resource controllers each having a maximum addressable location, the mechanism comprising:

selection means for selectively addressing memory and non-memory resources;

checking means for receiving an address and determining if the address is in a predetermined address region; and means for controlling the selection means responsive to the checking means, wherein the range specified by the programmable address register is truncated at the maximum addressable location of the resource controller specified by the programmable address register.

20. An address decoder as in claim 19, further comprising:

limitation means for defining attributes for the predetermined address region and limiting access to the predetermined address region responsive to those attributes.

21. An address decoder as in claim 19, wherein the controlling means deterministically controls the selection means when the checking means determines the address is in more than one predetermined address region.

\* \* \* \* \*